US010764485B2

(12) United States Patent
Izaki et al.

(10) Patent No.: US 10,764,485 B2
(45) Date of Patent: Sep. 1, 2020

(54) DISPLAY CONTROL APPARATUS AND CONTROL METHOD THEREFOR

(71) Applicant: CANON KABUSHIKI KAISHA, Tokyo (JP)

(72) Inventors: Yuko Izaki, Kawasaki (JP); Daiyu Ueno, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 333 days.

(21) Appl. No.: 15/607,344

(22) Filed: May 26, 2017

(65) Prior Publication Data
US 2017/0351381 A1 Dec. 7, 2017

(30) Foreign Application Priority Data

Jun. 1, 2016 (JP) .................................. 2016-110352
Sep. 7, 2016 (JP) .................................. 2016-174893

(51) Int. Cl.
*G06F 3/0488* (2013.01)
*H04N 5/232* (2006.01)

(52) U.S. Cl.
CPC ..... *H04N 5/23212* (2013.01); *H04N 5/23216* (2013.01); *H04N 5/23219* (2013.01); *G06F 3/0488* (2013.01)

(58) Field of Classification Search
None
See application file for complete search history.

(56) References Cited

U.S. PATENT DOCUMENTS

| 2012/0281018 | A1* | 11/2012 | Yamamoto | G06F 1/1626 345/634 |
| 2013/0155100 | A1* | 6/2013 | Sang | H04N 1/212 345/619 |
| 2014/0114190 | A1* | 4/2014 | Chiang | G06F 3/0488 600/440 |
| 2014/0267803 | A1* | 9/2014 | Shintani | H04N 5/23293 348/208.2 |
| 2016/0334948 | A1* | 11/2016 | Matsumoto | G06F 16/51 |

FOREIGN PATENT DOCUMENTS

| JP | 2002-287904 A | 10/2002 |
| JP | 2013-130758 A | 7/2013 |
| JP | 2015-55775 A | 3/2015 |
| JP | 2015-055965 A | 3/2015 |

* cited by examiner

*Primary Examiner* — Antonio Xavier
(74) *Attorney, Agent, or Firm* — Canon U.S.A., Inc. IP Division

(57) ABSTRACT

A display control apparatus includes a touch detection unit configured to detect a touch performed on a display unit, a specifying unit configured to specify a target of specification in a predetermined region of the display unit according to a touched position, and a display control unit configured to control an object identification mark to be displayed in the predetermined region so as to indicate a first axis and a second axis that makes the target specified by the specifying unit based on the touched position of the touch become an intersection point with the first axis in response to the touch performed in the predetermined region, and control the object identification mark to be hidden when the touch is released.

23 Claims, 8 Drawing Sheets

DISPLAY CONTROL APPARATUS AND CONTROL METHOD THEREFOR

BACKGROUND OF THE INVENTION

Field of the Invention

The present invention relates to a display control apparatus and a control method therefor, particularly relates to a technique for displaying a selection position when a position on a touch panel is selected through a touch operation.

Description of the Related Art

As a setting method of an autofocus (AF) position, there is provided a method in which a user selects a desired position from selection candidates displayed on a screen. Japanese Patent Application Laid-Open No. 2015-55775 discusses a technique in which a user selects a frame for which AF processing is performed through a dial operation from among a plurality of frames displayed on an AF setting screen to display an AF frame on a selected position. Further, as a display method of a marker that indicates a touched position on a display screen, Japanese Patent Application Laid-Open No. 2002-287904 discusses a technique for displaying a marker at a position away from a touched position to prevent the marker from being hidden by a finger.

If selection of the AF frame described in Japanese Patent Application Laid-Open No. 2015-55775 is performed through a touch operation with respect to a touch panel, a user may directly touch and select one AF frame from among a plurality of AF frames displayed on the touch panel. In this case, because a marker is displayed at a touched position, positions of the finger and the AF frames overlap with each other, so that it will be difficult to figure out which frame is selected. Therefore, if a marker is displayed at a position shifted from the touched position as described in Japanese Patent Application Laid-Open No. 2002-287904, it is difficult to accurately figure out which frame is actually selected, so that the frame actually selected may not be the frame the user intended to select.

In order to solve the above-described problem, the present invention is directed to a method of indicating a position selected by a user more accurately and clearly when a position is selected through a touch operation with respect to a touch panel configured integrally with a display unit.

SUMMARY OF THE INVENTION

According to an aspect of the present invention, a display control apparatus includes a touch detection unit configured to detect a touch performed on a display unit, a specifying unit configured to specify a specifying object in a predetermined region of the display unit according to a touched position, and a display control unit configured to control, in response to a touch being performed in the predetermined region, to display identification mark in the predetermined region to indicate a first axis and a second axis, wherein an intersection point of the first axis and the second axis corresponds with the specifying object specified by the specifying unit based on touched position of the touch, and to hide the identification mark when the touch is released.

Further features of the present invention will become apparent from the following description of exemplary embodiments with reference to the attached drawings.

DESCRIPTION OF THE EMBODIMENTS

Hereinafter, exemplary embodiments of the present invention will be described with reference to the appended drawings.

Figure 1A:
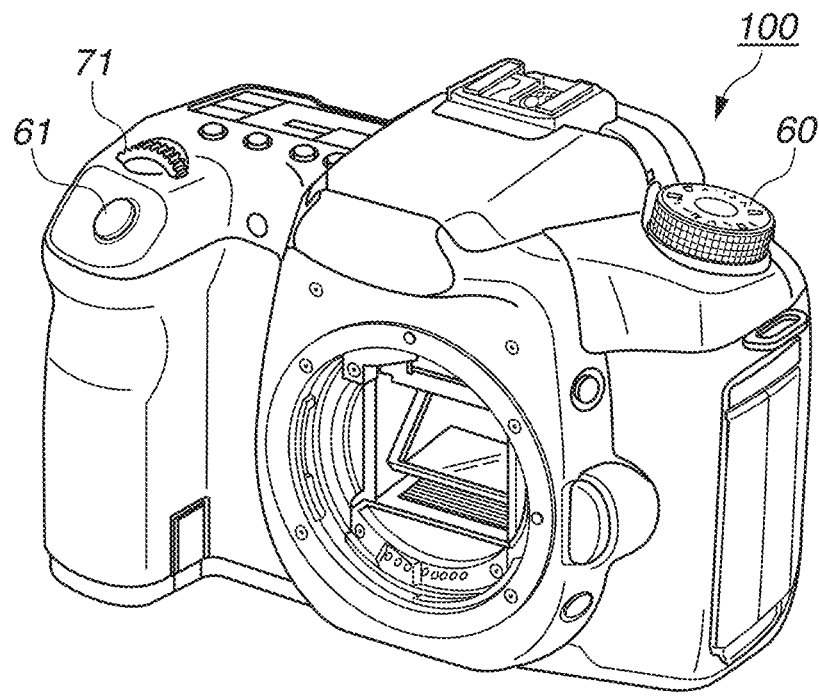
FIGS. 1A and 1B are diagrams illustrating external views of a digital camera as one example of an apparatus to which a configuration of a present exemplary embodiment is applicable.
Figure 1B:
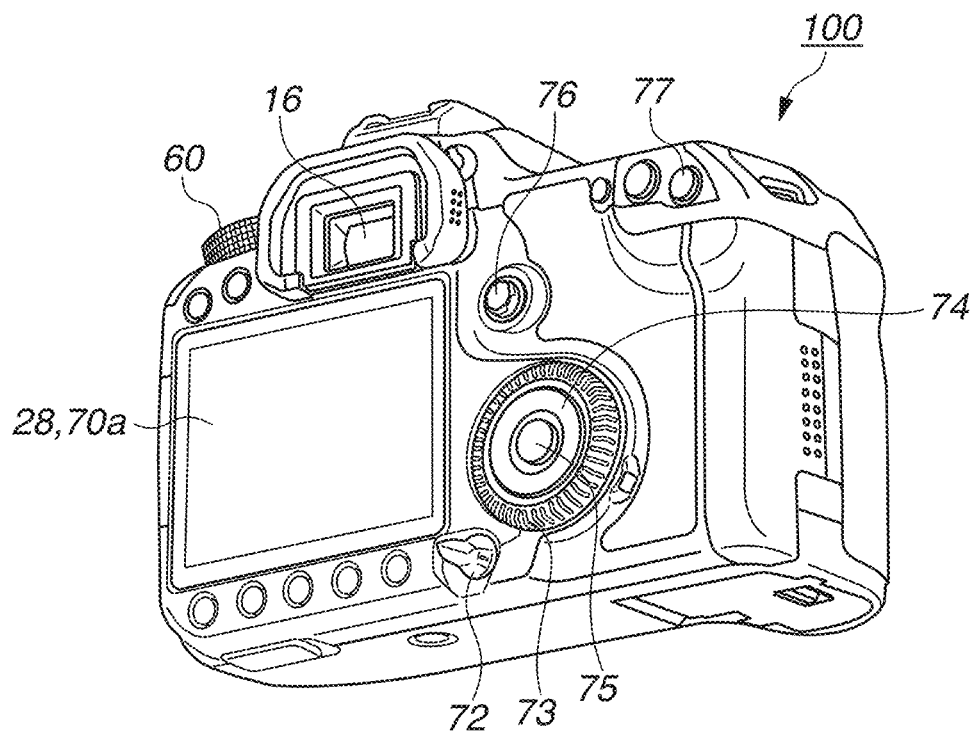

FIGS. 1A and 1B are diagrams illustrating external views of a digital camera as one example of a display control apparatus of the present invention. A shutter button 61 is an operation unit for inputting an imaging instruction (an imaging instruction is accepted at a first pressed level and image capturing operation is executed at a second pressed level).

A mode shifting switch 60 is an operation unit for shifting various modes. A main electric dial 71 is a rotational operating member included in an operating portion 70, and a user can change a setting value of a shutter speed or an aperture by rotating the main electric dial 71. Further, according to the rotational operation of the main electric dial 71, the user can change a setting of an autofocus (AF) focusing point or a zone AF in an AF setting screen, a setting of an AF position in a live view image, and a setting of a white balance.

A display unit 28 displays images and various types of information. The display unit 28 is configured integrally with a touch panel 70a capable of accepting a touch operation. The present exemplary embodiment is applicable to both of configurations in which a mechanism of the touch panel 70a is included in the display unit 28 (i.e., in-cell) and in which coordinates of the touch panel 70a and coordinates of the display unit 28 are overlapped and associated with each other. A power switch 72 is an operating member for switching ON/OFF states of the power source of a digital camera 100. A sub-electric dial 73 is a rotational operating member included in the operating portion 70, through which the user can move a selection frame or shift images. A cross key 74 is a four-direction key included in the operating portion 70, which can be pressed in at an upper, a lower, a right, and a left portion thereof. An AF frame selection button 77 is a button for displaying a selection screen of AF focusing points.

The user can perform operation according to the pressed portion of the cross key 74. A SET button 75 is a press key included in the operating portion 70, which is mainly used for confirming a selected item. A multi-controller 76 is included in the operating portion 70, and a user can move a selection position or a cursor in an operating direction by tilting the multi-controller 76 in respective directions of the up, the down, the left, and the right.

The user can observe an object via a mirror by looking into a finder portion 16.

Figure 2:
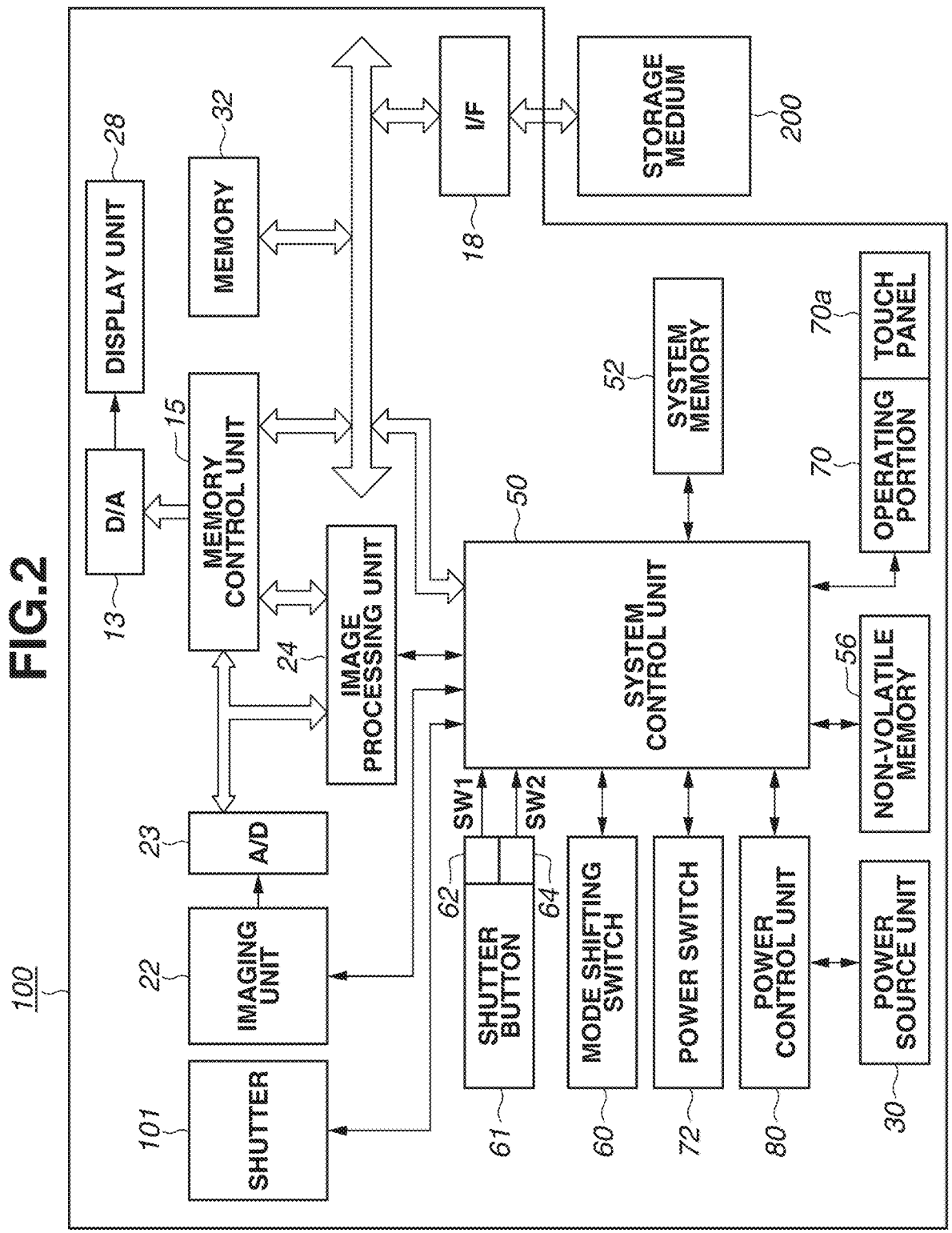
FIG. 2 is a block diagram illustrating a configuration example of the digital camera as one example of an apparatus to which the configuration of the present exemplary embodiment is applicable.

FIG. 2 is a block diagram illustrating a configuration example of the digital camera 100 according to the present exemplary embodiment.

In FIG. 2, a shutter 101 is a shutter having an aperture function. An imaging unit 22 is an image sensor configured of a charge coupled device (CCD) sensor or a complementary metal-oxide semiconductor (CMOS) sensor which converts an optical image into an electric signal. An analog/digital (A/D) conversion unit 23 is used for converting an analog signal output from the imaging unit 22 into a digital signal.

An image processing unit 24 executes predetermined resizing processing such as scaling and pixel interpolation, or color conversion processing with respect to data received from the A/D conversion unit 23 or a memory control unit 15. Further, the image processing unit 24 executes predetermined arithmetic processing by using captured image data, and a system control unit 50 executes exposure control and focusing control based on the acquired arithmetic result. With this configuration, autofocus (AF) processing, auto-exposure (AE) processing, and pre-flash (EF) processing are executed with a through-the-lens (TTL) method. The image processing unit 24 executes predetermined arithmetic processing by using captured image data, and further executes auto-white balance (AWB) processing by the TTL method based on the acquired arithmetic result.

Data output from the A/D conversion unit 23 is directly written in a memory 32 via the image processing unit 24 and the memory control unit 15, or via the memory control unit 15 without interposing the image processing unit 24. The memory 32 stores image data acquired by the imaging unit 22 and converted into digital data by the A/D conversion unit 23 or image data displayed on a display unit 28. The memory 32 has a storage capacity sufficient for storing a predetermined number of still images or a predetermined period of a moving image or audio data. Further, the memory 32 also serves as an image display memory (video memory). A digital/analog (D/A) conversion unit 13 converts image display data stored in the memory 32 into an analog signal and supplies the analog signal to the display unit 28. With this configuration, the image display data written in the memory 32 is displayed on the display unit 28 via the D/A conversion unit 13. The display unit 28 displays data on a display device such as a liquid crystal display (LCD) according to the analog signal transmitted from the D/A conversion unit 13. Data that has initially been converted into a digital signal by the A/D conversion unit 23 through A/D conversion is stored in the memory 32. Then, the digital signal is converted into an analog signal by the D/A conversion unit 13 and successively transferred to the display unit 28. The display unit 28 displays data of the received analog signal, so as to function as an electric view finder to execute live view image display.

A non-volatile memory 56 is a storage medium electrically erasable, recordable, and readable by a system control unit 50 having a built-in processor. For example, a memory such as an electrically erasable programmable read-only memory (EEPROM) may be used as the non-volatile memory 56. The non-volatile memory 56 stores an operation constant for the system control unit 50 and a program. Herein, "program" refers to a computer program for implementing various flowcharts described in the present exemplary embodiment.

The system control unit 50 includes at least one processor, and controls the entire digital camera 100. The system control unit 50 executes the above-described program stored in the non-volatile memory 56 to realize below-described respective pieces of processing according to the present exemplary embodiment. A random access memory (RAM) is used as a system memory 52. Operation constants and variables of the system control unit 50 and a program read from the non-volatile memory 56 are loaded on the system memory 52. Further, the system control unit 50 controls the memory 32, the D/A conversion unit 13, and the display unit 28 to execute display control.

The mode shifting switch 60, the shutter button 61, and the operating portion 70 are operation units for inputting various operation instructions to the system control unit 50.

The mode shifting switch 60 can shift an operation mode of the system control unit 50 to any one of a still image recording mode, a moving image capturing mode, and a playback mode. An auto-imaging mode, an auto-scene discrimination mode, a manual mode, various scene modes corresponding to imaging settings of different imaging scenes, a program AE mode, and a custom mode are the modes included in the still image recording mode. The user can directly switch the operation mode to any one of the modes included in a menu screen through the mode shifting switch 60. Alternatively, the user may use another operating member to shift the operation mode to any one of these modes included in the menu screen after temporarily shifting the screen to the menu screen through the mode shifting switch 60. Similarly, a plurality of modes may be also included in the moving image capturing mode.

When a shutter button 61 provided on the digital camera 100 is operated halfway and brought into a so-called half-pressed state (i.e., acceptance of an imaging preparation instruction), a first shutter switch 62 is turned ON so as to generate a first shutter switch signal SW1. With generation of the first shutter switch signal SW1, processing such as AF processing, AE processing, AWB processing, and EF processing are started with respect to a position or a region previously set by the user. At this time, if a position for executing the processing is not previously set by the user, the processing may be executed on a central position in an imaging range or a position where a human face or an object is detected.

When a shutter button 61 is operated completely and brought into a so-called fully-pressed state (i.e., acceptance of an imaging instruction), a second shutter switch 64 is turned ON so as to generate a second shutter switch signal SW2. With generation of the second shutter switch signal SW2, the system control unit 50 starts operation of a series of imaging processing such as capturing a still image through the imaging unit 22, reading a signal from the imaging unit 22, and writing image data into the storage medium 200.

By the user selecting and operating various function icons displayed on the display unit 28, the functions are assigned to respective operating members of the operating portion 70 as appropriate according to a situation, so that the operating members function as various function buttons. For example, the function buttons may be an end button, a return button, an image-forwarding button, a jump button, a narrowingdown button, and an attribute-changing button. For example, when a menu button is pressed, a menu screen including various settable items is displayed on the display unit 28. The user can intuitively perform various settings by using the menu screen displayed on the display unit 28, the four-direction button 74 in the up/down/right/left directions, and the SET button 75.

A power control unit 80 is configured of a battery detection circuit, a direct current-to-direct current (DC-DC) converter, and a switching circuit for switching blocks to be energized, so as to execute detection of presence or absence of attached batteries, battery types, and a remaining battery capacity. Further, based on the detection result and an instruction from the system control unit 50, the power control unit 80 controls the DC-DC converter to supply required voltage to respective units including the recording medium 200 for a required period. The power switch 72 switches the ON/OFF states of the power source.

A power source unit 30 is configured of a primary battery (i.e., an alkaline battery or a lithium battery), a secondary battery (i.e., a nickel-cadmium (NiCd) battery, a nickel-metal hydride (NiMH) battery, or a lithium-ion (Li-ion) battery), and an alternating current (AC) adapter. A storage medium interface (I/F) 18 is an interface with the storage medium 200 such as a memory card or a hard disk. The storage medium 200 is a non-volatile storage medium such as a memory card for storing images in the image capturing period, and configured of a semiconductor memory, an optical disk, or a magnetic disk.

Further, a touch panel 70a capable of detecting a touch with respect to the display unit 28 is provided as a part of the operating portion 70. The touch panel 70a can be integrally configured with the display unit 28. For example, the touch panel 70a is formed so that the light transmittance thereof does not interfere with display of the display unit 28, and is attached to an upper layer of a display face of the display unit 28. Then, the input coordinates of the touch panel 70a are associated with the display coordinates of the display unit 28. With this configuration, it is possible to provide a graphical user interface (GUI) which the user can use as if the user directly operates a screen displayed on the display unit 28. The system control unit 50 can detect the following operations with respect to the touch panel 70a or the states of the touch panel 70a.

A state where a finger or a stylus pen that has not touched the touch panel 70a newly touches the touch panel 70a, i.e., a touch is started (hereinafter, referred to as "Touch-Down").

A state where a finger or a stylus pen keeps touching the touch panel 70a (hereinafter, referred to as "Touch-On").

A state where a finger or a stylus pen moves while touching the touch panel 70a (hereinafter, referred to as "Touch-Move").

A state where a finger or a stylus pen that has touched the touch panel 70a is removed, i.e., a touch is ended (hereinafter, referred to as "Touch-Up").

A state where neither a finger nor a stylus pen touches the touch panel 70a (hereinafter, referred to as "Touch-Off").

When Touch-Down is detected, Touch-On is also detected simultaneously. Normally, unless Touch-Up is detected after Touch-Down, Touch-On is detected continuously. Touch-Move is also detected while Touch-On is detected. Even if Touch-On is detected, Touch-Move is not detected if a touched position is not moved. After Touch-Up of all of touched fingers or a touched stylus pen is detected, the touch panel 70a is brought into Touch-Off. The above-described operations or the states and the position coordinates at which the finger or the stylus pen touches the touch panel 70a are notified to the system control unit 50 through an internal bus, and the system control unit 50 determines what operation has been executed on the touch panel 70a based on the notified information. A moving direction of the finger or the stylus pen moved on the touch panel 70a during Touch-Move can be also determined at each of vertical and horizontal components of the touch panel 70a based on the change of position coordinates. Further, when the user performs Touch-Up from Touch-Down after performing a certain period of Touch-Move on the touch panel 70a, it is assumed that a stroke is drawn thereon. The operation for quickly drawing a stroke is called "flick". The flick is an operation in which the user quickly moves the finger over a certain distance while touching the touch panel 70a and then removes the finger therefrom. In other words, the flick is an operation for quickly flicking and sweeping the touch panel 70a with the finger. When Touch-Move of a predetermined distance or more at a predetermined speed or more is detected and Touch-UP is then detected thereafter, the system control unit 50 determines that flick is performed. Further, when Touch-Move of a predetermined distance or more at a predetermined speed or less is detected, the system control unit 50 determines that drag is performed. various types of touch panels, i.e., a resistive film type, an electrostatic capacitance type, a surface elastic wave type, an infrared type, an electromagnetic induction type, an image recognition type, and an optical sensor type may be used as the touch panel 70a. A touch panel of any detection method may be employed, and the touch may be detected when the finger or the stylus pen is in contact with the touch panel 70a, or may be detected when the finger or the stylus pen is moved close to the touch panel 70a but not in contact therewith, according to the types of touch panels.

Figure 3:
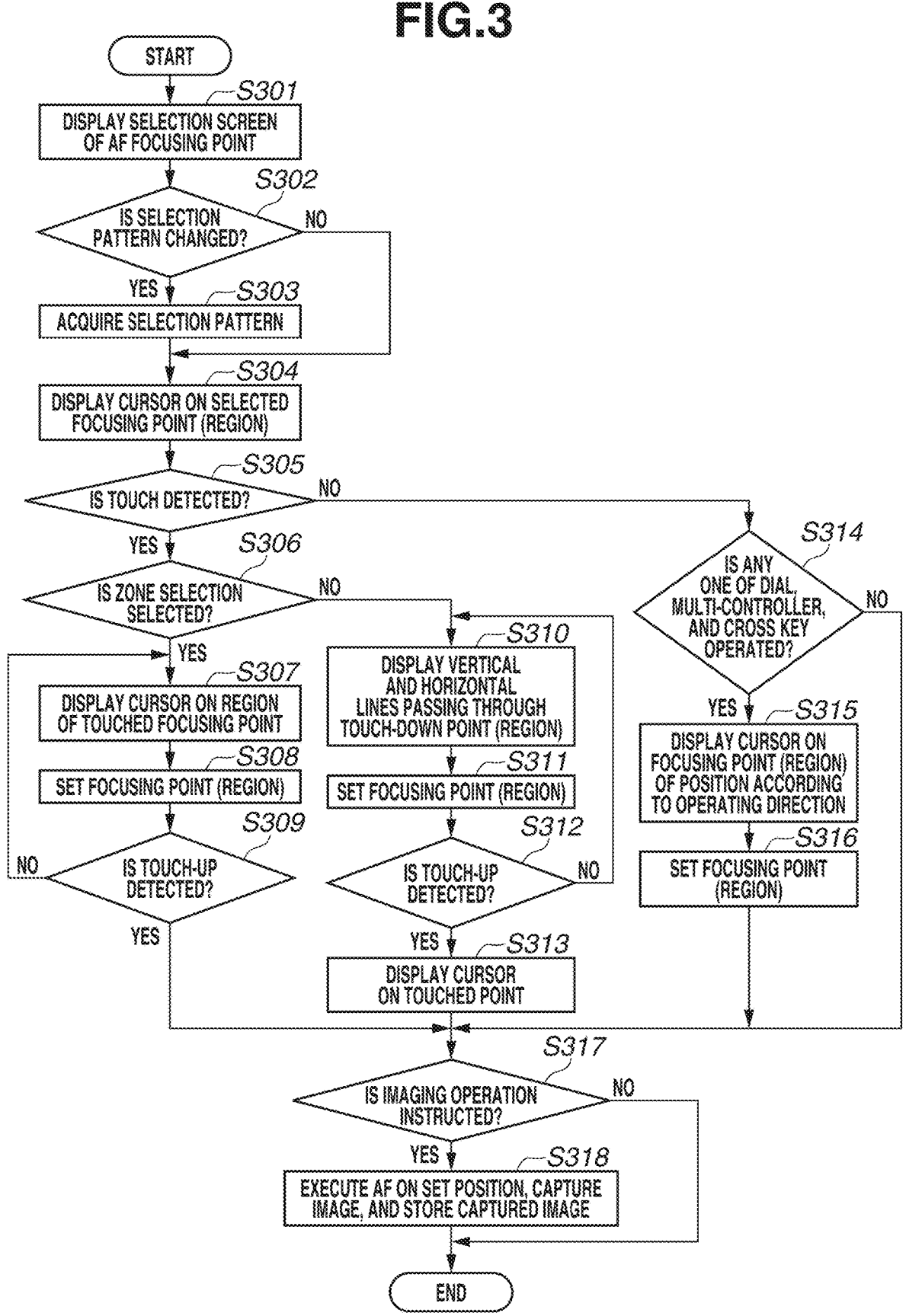
FIG. 3 is a flowchart illustrating selection processing of an autofocus (AF) focusing point according to a first exemplary embodiment.

Next, selection processing of AF focusing points in the present exemplary embodiment will be described with reference to FIG. 3. The processing in FIG. 3 is started when the user turns on the digital camera 100 and selects an item for changing an AF focusing point in a menu screen or presses the AF frame selection button 77. The processing is started when a selection screen of AF focusing points is displayed. The system control unit 50 loads a program stored in the non-volatile memory 56 onto the system memory 52 and executes the program to realize this processing.

In step S301, the system control unit 50 displays a selection screen of the AF focusing point on the display unit 28. In a selection screen 401 of the AF focusing point in FIG. 4A, the user can change a selection pattern of the AF focusing point and select or set the AF focusing point in the selected pattern. Although a number of frames normally displayed on the selection screen 401 is 61, the user can set the number of frames to 47 or 9 (the number of specifiable frames can be changed). The setting screen 401 includes a predetermined region for selecting the AF focusing point, which is a region where frames the user can select as the AF focusing point according to the touch operation are displayed, and the frames are displayed from one end to another end in the vertical direction as well as in the horizontal direction. Further, although an icon can be also selected from a region where the below-described icons 402 to 408 are displayed according to the touch operation, this region is not included in the predetermined region as it is not a region for selecting the AF focusing point. The frames of a number set at that time are displayed. Further, because a number of selectable frames (AF focusing points) varies according to lens types, the system control unit 50 judges the lens type to determine the frames to be displayed on the selection screen 401.

In step S302, the system control unit 50 determines whether a selection pattern of the AF focusing point is changed. The selection pattern of the AF focusing point can be selected from types indicated by the icons 402 to 408 in FIG. 4A. The icon 402 indicates "one-point spot AF" within which the user can adjust a focus to a narrow portion. The icon 403 indicates "one-point AF" with which the user can adjust a focus to a position of one point selected from the frames displayed on the selection screen 401. The icon 404 indicates "region extension AF" of optional selection, with which the user can adjust a focus to a selected one point and positions of narrow AF frames adjacent thereto on the upper/lower/right/left sides. The icon 405 indicates "region-extension AF" of optional peripheral selection, with which the user can adjust a focus to a selected one point and positions of the peripheral AF frames adjacent thereto. The icon 406 indicates "zone AF" with which the user can divide 61 AF frames into 9 focusing zones to adjust a focus to a selected focusing zone. The icon 407 indicates "large zone AF", with which the user can divide the AF region into 3 focusing zones (i.e., left, central, and right zones) to adjust a focus to a selected zone. The icon 408 indicates "auto-selection AF", with which the user can adjust a focus at the entire region of the 61 frames. The user can change a selection pattern of the AF focusing point by touching one of the icons 402 to 408, pressing the AF frame selection button 77, or rotating the main electric dial 71. The user may allocate a function of switching the selection patterns of the AF focusing point to the rotation of the main electric dial 71, so that the selection pattern can be switched by the rotation operation of the main electric dial 71. If the system control unit 50 determines that the selection pattern of the AF focusing point is changed (YES in step S302), the processing proceeds to step S303. On the other hand, if the system control unit 50 determines that the selection pattern is not changed (NO in step S302), the processing proceeds to step S304.

In step S303, the system control unit 50 acquires the selection pattern selected in step S302 and stores the selection pattern in the non-volatile memory 56.

In step S304, the system control unit 50 displays a cursor on the selected focusing point (region). A cursor 409 in FIG. 4A indicates a focusing point selected for the one-point spot AF.

In step S305, the system control unit 50 determines whether the touch operation is performed on the frame (within the predetermined region). If the system control unit 50 determines that the touch operation is performed (YES in step S305), the processing proceeds to step S306. On the other hand, if the system control unit 50 determines that the touch operation is not performed (NO in step S305), the processing proceeds to step S314.

In step S306, the system control unit 50 determines whether the current selection pattern is a zone selection (i.e., a pattern type of a large selection target including a large zone selection). If the system control unit 50 determines that the current selection pattern is the zone selection (YES in step S306), the processing proceeds to step S307. On the other hand, if the system control unit 50 determines that the current selection pattern is not the zone selection (NO in step S306) the processing proceeds to step S310.

Figure 4A:
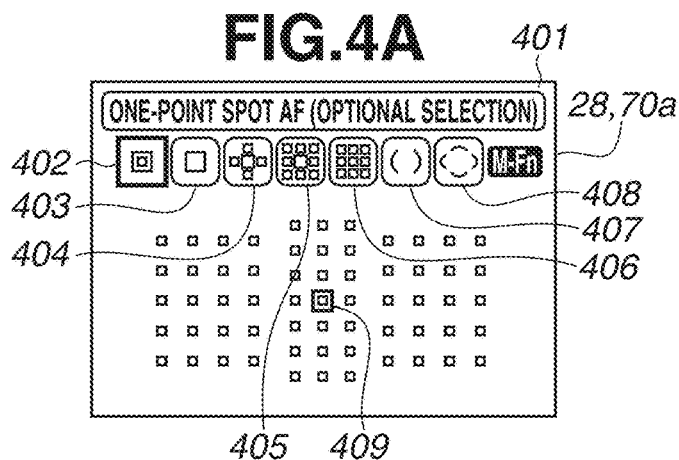
FIGS. 4A to 4H are diagrams illustrating selection states of AF focusing points according to the present exemplary embodiment.
Figure 4E:
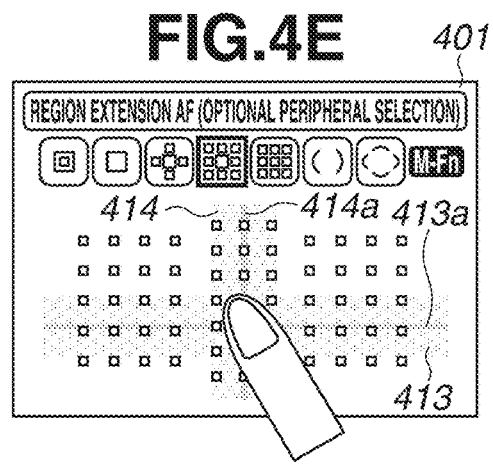
Figure 4B:
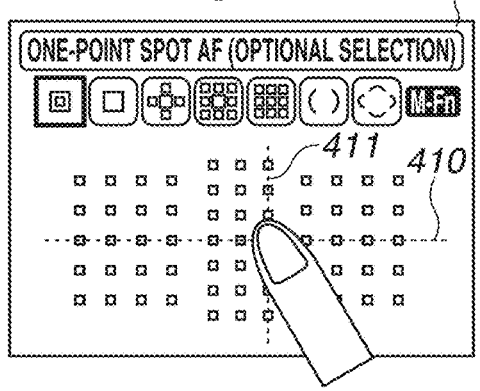
Figure 4F:
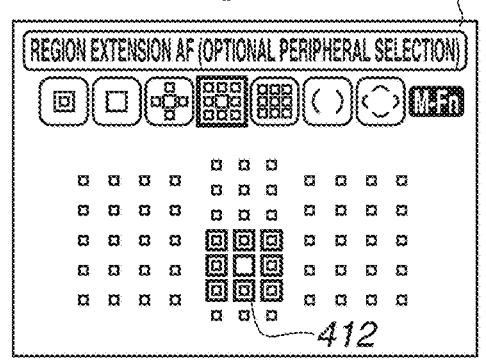
Figure 4C:
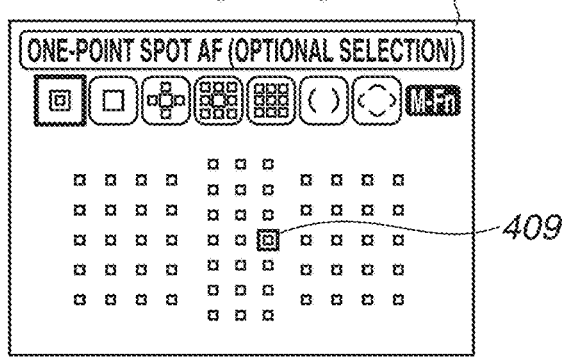
Figure 4G:
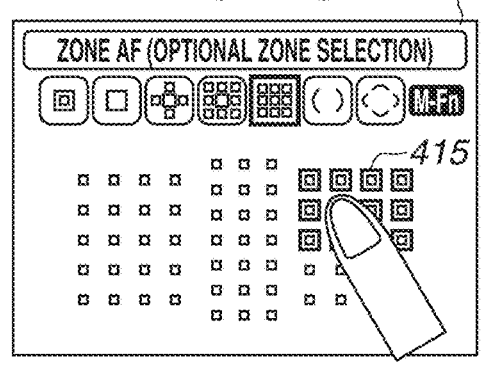

In step S307, as illustrated in FIG. 4G, the system control unit 50 displays a cursor 415 in a region of the touched focusing point. FIG. 4G is a diagram illustrating a display example of the zone selection in which the cursor 415 is displayed in the touched region from among the 9 focusing zones.

In step S308, the system control unit 50 sets the touched focusing zone as the focusing region and stores the setting in the system memory 52.

Figure 4D:
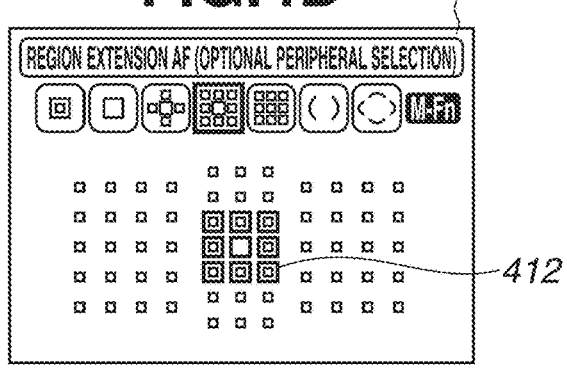
Figure 4H:
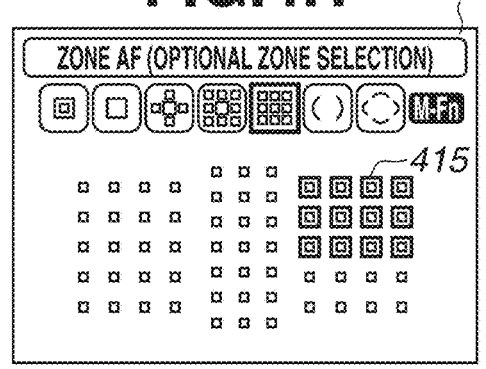

In step S309, the system control unit 50 determines whether the touch is released. If the system control unit 50 determines that the touch is released (YES in step S309), the processing proceeds to step S317. On the other hand, if the system control unit 50 determines that the touch is not released (NO in step S309), the processing returns to step S307, and the system control unit 50 sets the focusing region according to the touched position. However, if the touch continues without the touched position being moved, the processing in steps S307 and S308 does not have to be executed. FIG. 4H illustrates the selection screen 401 after the touch is released from a state illustrated in FIG. 4G, and the display content thereof is unchanged from the state illustrated in FIG. 4G.

In step S310, the system control unit 50 displays a vertical line and a horizontal line passing through the frame (region) where Touch-Down is performed (i.e., indicate a position of the selected one point). FIGS. 4A to 4C are diagrams illustrating an example of the selection screen 401 when the one-point spot AF is selected, whereas FIGS. 4D to 4F are diagrams illustrating an example of the selection screen 401 when the region extension AF of the optional peripheral selection is selected. Further, FIGS. 4B and 4E are diagrams illustrating examples of the selection screen 401 in a touched state. In a case of the one-point spot AF, as illustrated in FIG. 4B, a vertical line 411 (Y-axis direction) and a horizontal line 410 (X-axis direction) passing through the touched frame are displayed so as to be extended from a frame selected by the touch to a region where the other focusing points are displayed. In other words, the two lines 410 and 411 are displayed so as to make the touched point become an intersection point thereof. With this display, the user can accurately figure out a position of the touched frame even if the touched frame is hidden by the finger. Further, the above display is also effective when the finger is placed across a plurality of frames and the selected position is hardly recognized. The vertical line 411 and the horizontal line 410 may be displayed and extended to both ends of the X-axis and the Y-axis coordinates of the selection screen 401, or may be displayed and extended up to two or three frames adjacent to the touched frame. Further, in the region extension AF, as illustrated in FIG. 4E, in addition to a vertical line 414a and a horizontal line 413a indicating a touched frame, a vertical bold line 414 and a horizontal bold line 413 passing through peripheral frames of the touched frame, each of which has a width corresponding to these peripheral frames, are displayed. At this time, the vertical line 414a is positioned at the center of the vertical bold line 414 and displayed in a dark color, so as to be distinguishable from the vertical bold line 414. Similarly, the horizontal line 413a is also displayed to be distinguishable from the horizontal bold line 413, so that the touched frame (i.e., the frame selected as the AF region) is indicated thereby. At this time, because the bold lines 413 and 414 are displayed so as to indicate the touched and selected frame and the frames adjacent thereto on the right/left sides or the upper/lower sides, eight points (eight frames) surrounding the touched one point (frame) are clearly displayed, and thus a size of the selected region is recognizable. As described above, by changing a method of identifying and displaying the selection target, a size of the selection target can be recognized. However, if the touched frame is a frame arranged in the endmost column of the frames included in the selection screen 401, the number of surrounding frames may not be eight, and thus the bold line is displayed so as to indicate the frames that are settable as the AF focusing points adjacent to the touched frame. As described above, although the finger used for the selecting operation overlaps with the selected frame when the AF focusing point is selected by the touch operation, displaying a position of the frame with the lines enables the user to accurately figure out which frame under the finger is selected. In the example in FIG. 4B, the horizontal line 410 indicates that the touched frame is a fourth frame from the bottom, whereas the vertical line 411 indicates that the touched frame is a rightmost frame arranged in the central region (i.e., fifth frame from the right in the entire region). Further, as described above, a position specification pattern such as the one-point spot AF and the one-point AF, with which only a frame of a touched position is specified as the AF target, and a region specification pattern such as the region extension AF, with which a frame of a touched position and its surrounding frames adjacent thereto are specified as the AF targets, are displayed in different manners. In the position specification pattern, an object identification mark is used to make the frame at the touched position identifiable. On the other hand, in the region specification pattern, two lines are drawn to make the surrounding frames regarded as the AF targets also identifiable in addition to the frame at the specified touched position.

In step S311, the system control unit 50 sets (specifies) the touched frame (region of the touched frame) as the AF focusing point (region), and stores the setting in the system memory 52. In other words, the system control unit 50 specifies the AF position based on the touched position.

In step S312, the system control unit 50 determines whether the touch detected in step S305 is released. If the system control unit 50 determines that the touch is released (YES in step S312), the processing proceeds to step S313. On the other hand, if the system control unit 50 determines that the touch is not released (NO in step S312), the processing returns to step S310.

In step S313, the system control unit 50 displays a cursor on the AF focusing point (region) set in immediately preceding step S311. The selection screen 401 in FIG. 4C illustrates a state where the touch is released from the touched frame in FIG. 4B, so that a cursor 409 is displayed on the frame that was touched by the user. Further, the selection screen 401 in FIG. 4F illustrates a state where the touch is released from the touched frame in FIG. 4E, so that a cursor 412 is displayed on that frame. As described above, when the selection pattern is not the zone AF, the vertical and the horizontal lines that are displayed when the user is touching the screen are hidden, and a cursor 412 indicating the touched AF focusing point (region) set as the AF focusing point is displayed.

In step S314, the system control unit 50 determines whether any one of the main electric dial 71, the sub-electric dial 73, the multi-controller 76, and the cross key 74 is operated or none of them is operated. In other words, the system control unit 50 determines whether the AF focusing point is changed by the operation (specification operation) performed with the operating member other than the touch panel 70a. However, if the function of switching the selection pattern has been allocated to the rotation of the main electric dial 71, the system control unit 50 does not execute determination with respect to the main electric dial 71 in step S314. The main electric dial 71 can move the cursor in the horizontal direction, the sub-electric dial 73 can move the cursor in the vertical direction, the multi-controller 76 can move the cursor according to the operating direction thereof, and the cross key 74 can move the cursor in the vertical/horizontal directions. The selected frame is set as the AF focusing point along with the movement of the cursor. If the system control unit 50 determines that any one of the main electric dial 71, the sub-electric dial 73, the multi-controller 76, and the cross key 74 is operated (YES in step S314), the processing proceeds to step S315. If the system control unit 50 determines that none of the above operating members is operated (NO in step S314), the processing proceeds to step S317.

In step S315, the system control unit 50 displays a cursor on a focusing point of the position according to the operating direction. With respect to the AF focusing point selected in the selection screen 401 in FIG. 4A, for example, the cursor 409 moves to the above by one frame when the operation of moving in the upper direction is performed, and the cursor 409 moves to the right by one frame when the operation of moving in the right direction is performed. Similarly, in the region extension AF in FIG. 4D, the AF focusing point is moved according to the operating direction. In addition, the main electric dial 71 instructs the cursor to move in the right and the left directions, the sub-electric dial 73 instructs the cursor to move in the upper and the lower directions. Further, the cursor is moved in the right (or lower) direction by the rotation of the operating member in the right direction, and moved in the left (or upper) direction by the rotation in the left direction. However, when the selection pattern is the zone AF, the cursor is moved in the right and the left directions with any of the operating members. When the AF focusing point is changed by the operation of the operating member other than the touch panel 70a, the cursor is moved and displayed, and the line or the bold line indicating the selected frame is not displayed. When the user selects the AF focusing point by operating the operating member instead of performing the touch operation, the finger used for operating the operating member does not overlap the selected frame. Therefore, even if the line is not displayed as in the case of the touch operation, the user can figure out which frame is selected as long as the cursor is displayed. In addition, if the lines indicating the selected frame are displayed even though the finger used for the selecting operation does not overlap the cursor, it will be difficult to figure out whether a portion indicated by the lines is entirely selected or a portion indicated by the cursor is selected. Therefore, when the frame is selected by the operation of the operating member other than the touch panel 70a, the user can clearly figure out which frame is selected if the cursor is displayed.

In step S316, the system control unit 50 sets the selected frame (region of the selected frame) as the AF focusing point (region), and stores the setting in the system memory 52.

In step S317, the system control unit 50 determines whether image capturing operation is instructed. The user can instruct the image capturing operation by pressing the shutter button 61. If the system control unit 50 determines that image capturing operation is instructed (YES in step S317), the processing proceeds to step S318. On the other hand, if the system control unit 50 determines that image capturing operation is not instructed (NO in step S317), the processing is ended.

In step S318, the system control unit 50 executes autofocusing (AF) on the focusing point set in any one of steps S308, S311, and S316, and stores a captured image in the storage medium 200.

According to the above-described exemplary embodiment, when the frame provided on the selection screen 401 is selected through a touch operation onto the touch panel 70a configured integrally with the display unit 28, a frame selected by the user can be accurately indicated to the user without lowering the visibility. When the touch operation is performed, the selected frame is hidden under the finger used for performing the selecting operation. Therefore, displaying two lines indicating the selected position enables the user to intuitively figure out that an intersection point of the lines is selected. On the other hand, when the operation is performed through the operating member other than the touch panel 70a, the finger used for the selecting operation does not overlap the selected frame, so that the selected frame can be accurately indicated to the user by displaying the cursor.

In the present exemplary embodiment, the AF focusing point has been selected from single distance measurement points. However, in a case where, depending on the lens type, a frame that supports cross distance measurement is provided, a frame that supports cross distance measurement and a frame that does not support the cross distance measurement are displayed in different display modes. The frame that does not support the cross distance measurement is displayed with blinking, whereas the frame that supports the cross distance measurement is displayed without blinking. In addition to displaying the frame with blinking, a color expression or a thickness of a display line may be changed. Further, when the user touches the frame that supports cross distance measurement through the touch operation, the touched frame is displayed with a line thicker than the line used when the user touches the frame that supports single distance measurement. As described above, a display mode of the line may be changed according to the characteristics of the selected point.

Further, if the user operates the operating member other than the touch panel 70a while the user is operating the touch panel 70a, selection of the frame performed by the touch operation becomes invalid, and selection (i.e., movement of a cursor) performed through the operating member other than the touch panel 70a is prioritized. At this time, a cursor is displayed on the selected frame, and the lines passing through the frame are not displayed. However, if it is determined that a selected frame is placed under the finger because the user performs the touch operation while the frame is being selected through the operation other than the touch operation, a position of the frame may be indicated by displaying the lines.

Variation Example

Next, an exemplary embodiment to which the above-described exemplary embodiment is applicable will be described with reference to FIGS. 5A to 5D and FIGS. 6A to 6B.

Figure 5A:
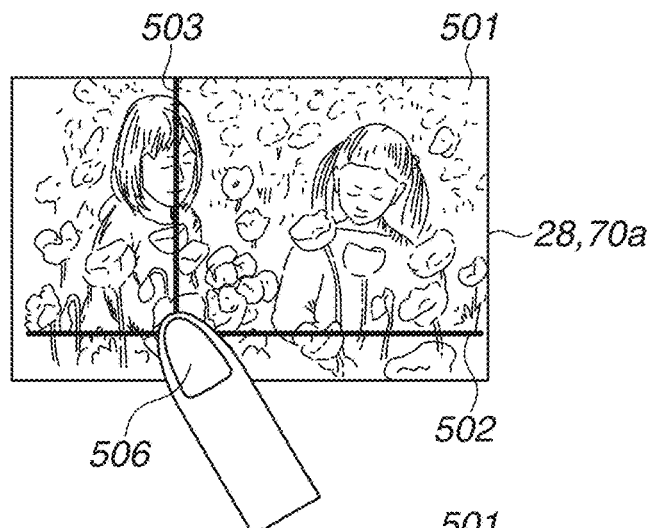
FIGS. 5A to 5D are diagrams illustrating selection states in a live view screen.
Figure 5B:
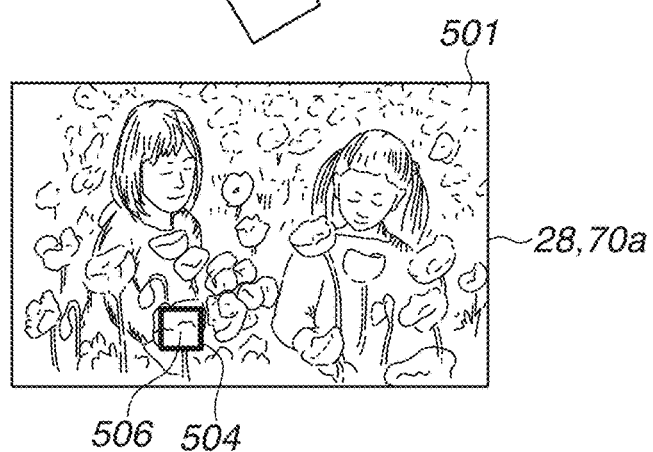
Figure 5C:
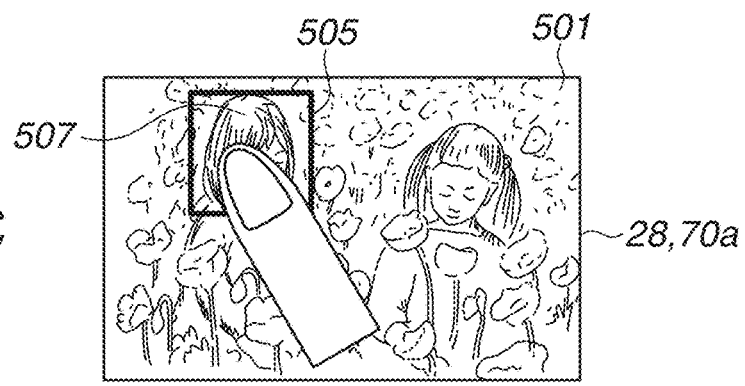
Figure 5D:
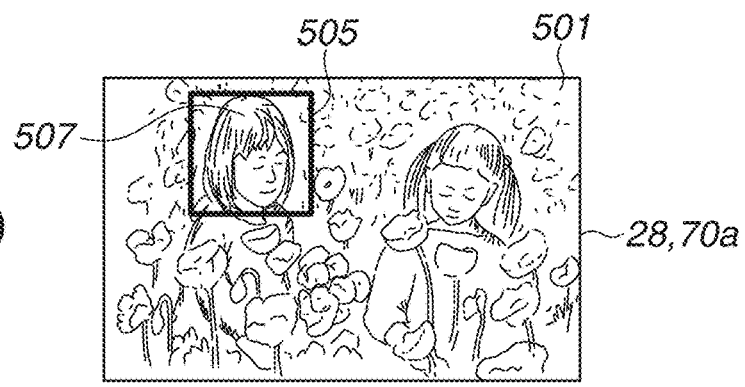

A display example in a case where an object for performing the AF processing in a live view image is selected will be described with reference to FIGS. 5A to 5D. When the object is selected in the live view image, the user can select an optional position on the live view image instead of selecting any one of a plurality of predetermined AF frames as illustrated in the examples in FIG. 4. In FIGS. 5A to 5D, an image 501 is displayed on the display unit 28 configured integrally with the touch panel 70a, and the user selects a small flower and a human face in FIGS. 5A/5B and FIGS. 5C/5D, respectively. In FIG. 5A, the user touches an object 506 (i.e., flower) with a finger, and the object 506 is hidden by the finger touching the object 506. Therefore, a horizontal line 502 and a vertical line 503 are displayed. Further, as illustrated in FIG. 5B, an AF frame 504 indicating the object 506 as an AF target is displayed when the touch is released, and the horizontal line 502 and the vertical line 503 are hidden. When the object 506 is selected through the operating member other than the touch panel 70a, the AF frame is moved without displaying the lines. Further, as illustrated in FIG. 5C, when the user touches an object 507 that is detected as a face having a known size (the size larger than the size of the object 506) through face detection processing, even in a touched state, an AF frame 505 is displayed without displaying the lines because the object 507 has already been detected as a face. The AF frame 505 is displayed based on the size of the face detected by the face detection processing. At this time, as illustrated in FIG. 5D, the AF frame 505 is displayed continuously even after the touch is released. As described above, when the object touched by the user has a size smaller than a predetermined size which can be hidden by the finger, the touched object is indicated by the lines instead of displaying the AF frame. When the object has a size larger than the predetermined size (the size larger than the size of the finger), and thus the user can figure out the touched object, the AF frame is displayed without displaying the line. Further, a size of the object touched by the user is detected by an object detection unit for detecting object information from the image acquired from the imaging unit 22. When image capturing operation is instructed, the system control unit 50 adjusts a focus to the object indicated by the AF frame 505 or the lines, and captures an image.

As described above, according to the variation example described with reference to FIGS. 5A to 5D, the user can figure out as to which object of what position is selected more accurately regardless of the size of the touched object (target).

If the AF frame is displayed at a position slightly separated from the selected object so as not to overlap the finger that touches the object, the user may be confused whether the touched portion is selected or a portion where the AF frame is displayed is selected. Further, if the selected object is indicated by the AF frame that is displayed in a size larger than the size of the selected object, it is difficult to figure out which object inside the AF frame is selected. Therefore, as described above, as to whether to display the AF frame or to indicate the object by the lines may be determined according to whether a size of the touched object is larger or smaller than the predetermined size, so that the position of the selected object can be confirmed more accurately. In addition, a color of the line or a display mode may be changed according to the selected object.

Figure 6A:
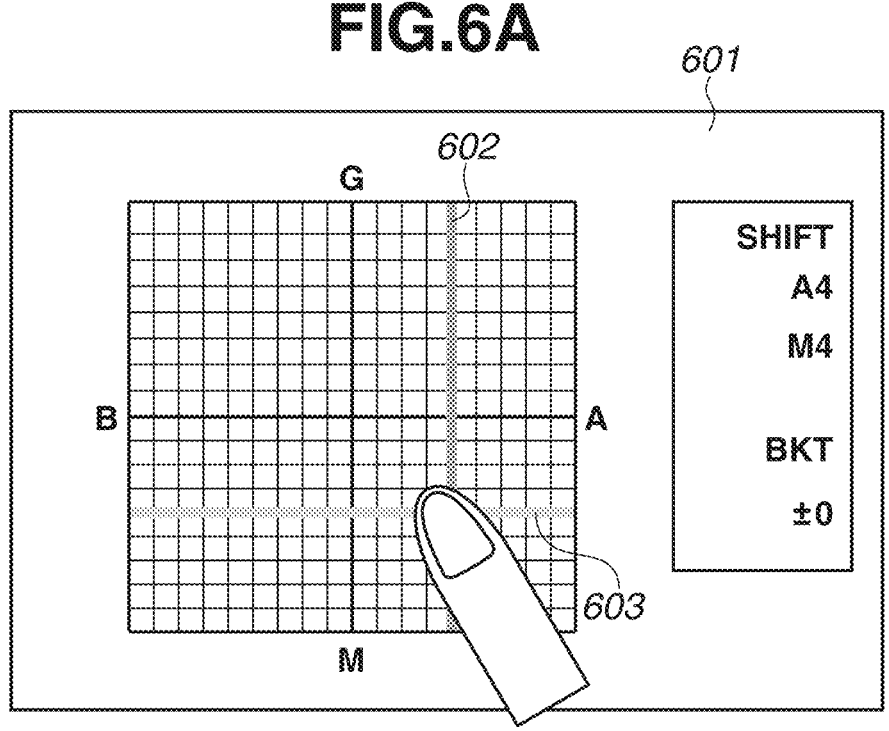
FIGS. 6A and 6B are diagrams illustrating selection states on a white balance selection screen.
Figure 6B:
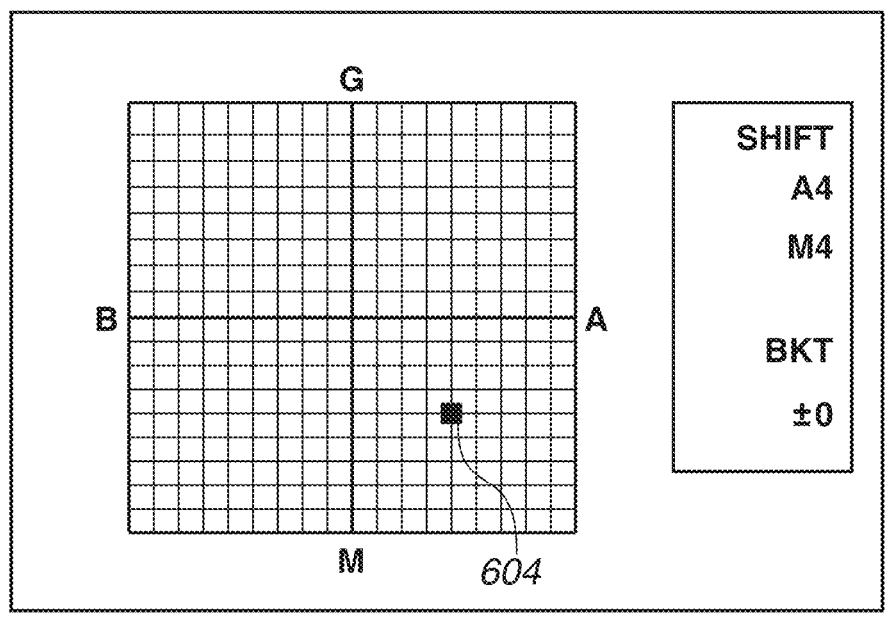

Next, a display example at a time of setting a white balance will be described with reference to FIGS. 6A and 6B. FIG. 6A is a diagram illustrating a selection screen 601 for setting a white balance shift, and positions A, B, G, and M represent respective colors of umber, blue, green, and magenta. The white balance shifts toward respective colors as it approaches the positions A, B, G, and M. Color temperature is determined by the horizontal axis extending from the position B to the position A, and color correction different from the color temperature can be adjusted by the vertical axis extending from the position M to the position G.

As illustrated in FIG. 6A, when the user touches a scale mark of the selection screen 601, a horizontal line 603 and a vertical line 602 indicating the scale mark of the touched position are displayed. At this time, the horizontal line 603 may be displayed in a color using magenta and green according to the Y-coordinate of the touched position, and the vertical line 602 may be displayed in a color using green and umber according to the X-coordinate of the touched position. In a case of the example in FIG. 6A, the horizontal line 603 is displayed in a color close to magenta, whereas the vertical line 602 is displayed in a color close to umber. FIG. 6B is a diagram illustrating a display after the touch is released, and a mark 604 indicating a position of the selected scale mark is displayed. In addition, when the white balance is set by the operating member other than the touch panel 70a, the setting is indicated by the mark 604.

According to the variation example described with reference to FIGS. 6A and 6B, the user can accurately figure out the position of the touched scale mark. Further, based on the colors of the lines, the user can intuitively figure out what indexes are indicated by the touched scale mark.

According to the above-described exemplary embodiment, when the user selects a desired position (setting value) displayed on the display unit 28 according to the touch operation onto the display unit 28, the user can accurately figure out which position (setting value) is selected. Further, the variation example is also applicable to selection of coordinates, selection of a cell of a table, and selection of a numerical value on a bar (by displaying a single line), in addition to the above-described exemplary embodiments.

Figure 7A:
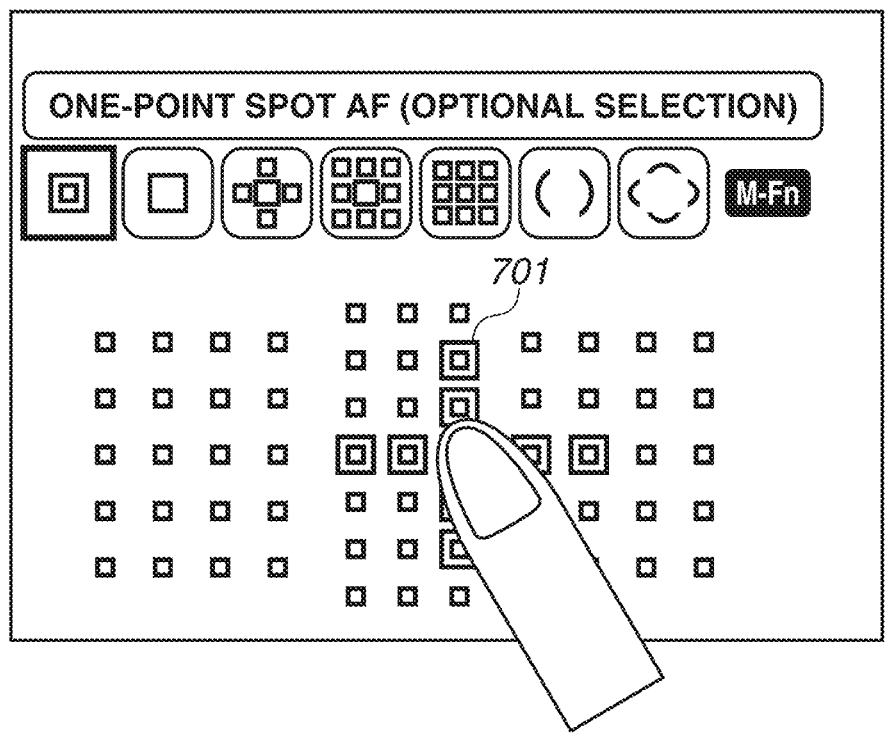
FIGS. 7A and 7B are diagrams illustrating examples of object identification marks to which the present exemplary embodiment is applicable.
Figure 7B:
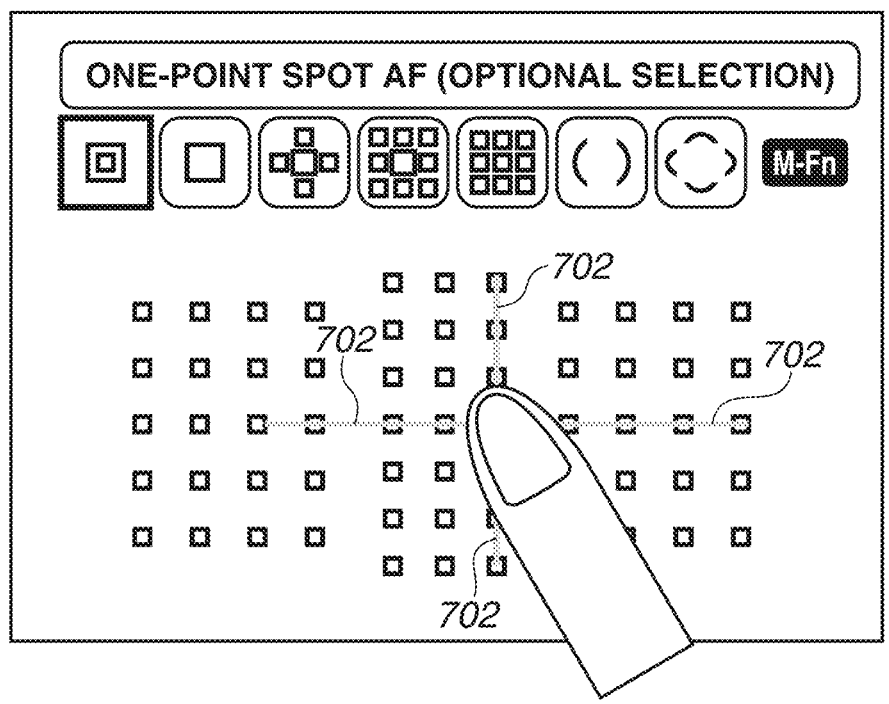

Further, in the above-described exemplary embodiments, although a touched frame has been indicated by a horizontal line and a vertical line (that is different from the horizontal line by 90-degree and orthogonal thereto), the exemplary embodiment is not limited thereto, and any two lines may be used as long as the touched point can be indicated thereby. Further, although the lines have been displayed so as to pass through the touched frame, as illustrated in FIG. 7A or 7B, an object identification mark which does not pass through the selected frame may be displayed at a position nearby. FIGS. 7A and 7B are diagrams illustrating display examples of touched frames. In FIG. 7A, frames adjacent to the touched frame are identified and displayed (i.e., object identification mark 701) instead of being indicated by a line. As described above, the object identification mark capable of accurately indicating the touched position can be used instead of the lines passing through the touched frame. In other words, of the frames displayed in a matrix state, frames arranged in the same row and the column as that of the touched frame are identified and displayed. In FIG. 7B, lines 702 passing through adjacent frames without passing through a touched frame are displayed. Further, when a selection pattern is the region extension AF, instead of identifying and displaying the frames adjacent to the touched frame, a line passing through the frames adjacent to the set region, or the frames adjacent thereto may be identified and displayed. As described above, by displaying the object identification mark indicating the touched frame at a nearby position within a certain distance from the touched frame (i.e., by displaying the lines or highlighting the position), the user can accurately figure out which position is selected. If the object identification mark is displayed at a position away from the touched frame, a distance between the position of the identification mark and the touched frame becomes longer. Therefore, the user has to follow imaginary straight lines extending from positions of two points where the object identification marks are displayed to the touched position to figure out a crossing point of the lines, so that it is difficult for the user to intuitively and accurately figure out the touched point.

In addition, the above processing does not have to be executed in a case where a small number of frames are selectable. For example, when the 61 frames are selectable, the lines that indicate the touched point may be displayed. On the other hand, in a case where a small number of frames (e.g., less than 30 frames) are the selection candidates, the user is less likely to have difficulty in figuring out what position is touched. In such a case, a touched frame may be identified and displayed instead of displaying the lines. Further, the above processing does not have to be executed when a small number of items are displayed on the screen.

Further, in the above described exemplary embodiment, although the touched frame is identified and displayed after the lines are hidden in response to the release of the touch, the line may be displayed until a predetermine time (e.g., one or two seconds) have passed after the touch is released, and the display may be switched (the line may be hidden) when the predetermined time has passed. Further, the touched frame may be identified and displayed before the touch is released.

Furthermore, a mouse may be used as the operating member other than the touch panel 70a. The lines do not have to be displayed when the mouse is used because a selected frame can be indicated by the cursor displayed thereon.

Figure 8:
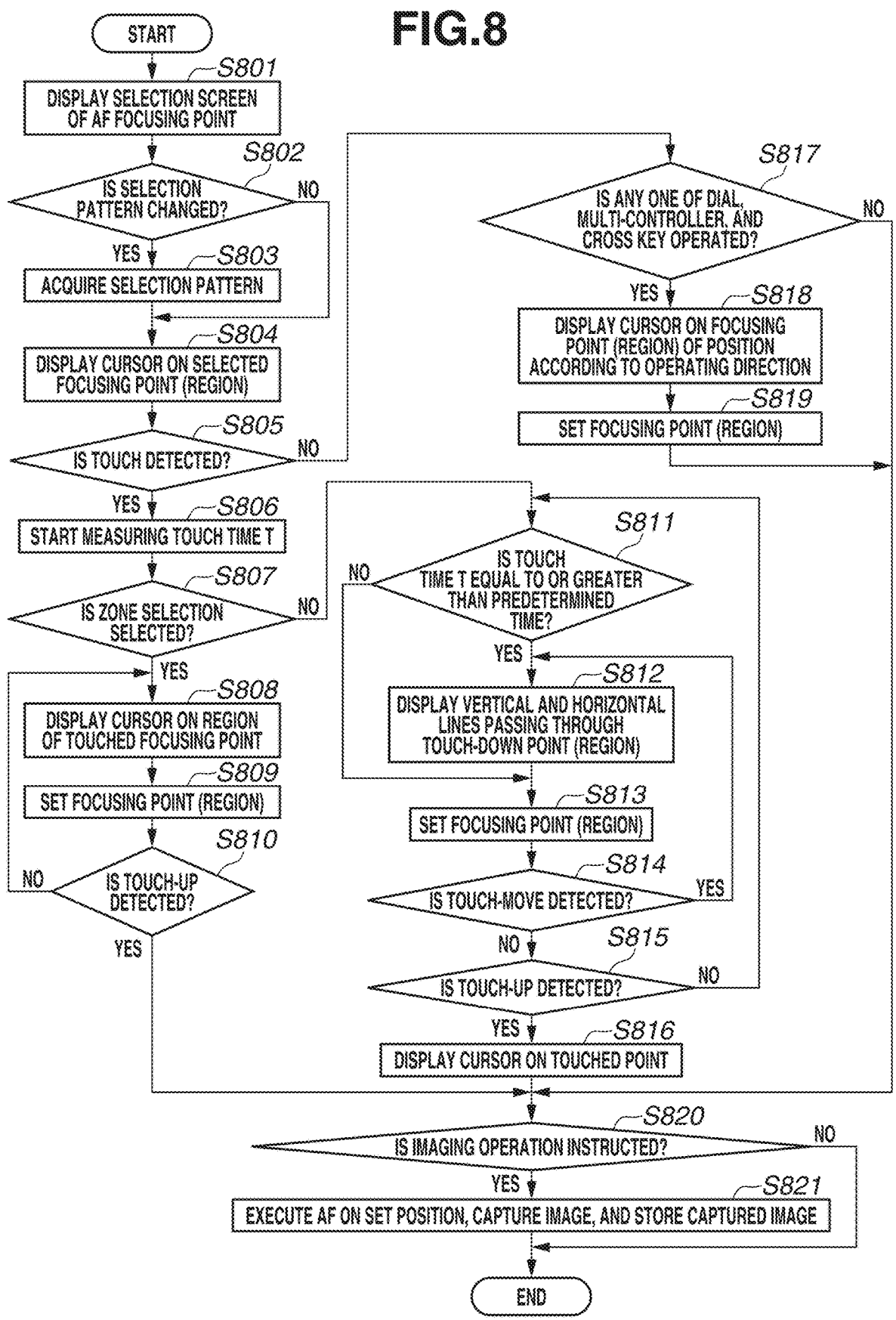
FIG. 8 is a flowchart illustrating selection processing of an AF focusing point according to a second exemplary embodiment.

Next, selection processing of the AF focusing point in a second exemplary embodiment of the present invention will be described with reference to FIG. 8. The present exemplary embodiment is similar to the above-described first exemplary embodiment except for the flowchart illustrated in FIG. 3. The selection processing of the AF focusing point in the present exemplary embodiment is different from that of the first exemplary embodiment in that vertical and horizontal lines are displayed when a predetermined time or more has passed after a start of a touch on a focusing point. The processing in FIG. 8 is started when the user turns on the digital camera 100 and selects an item for changing an AF focusing point from a menu screen or presses the AF frame selection button 77. The processing is started when a selection screen of AF focusing points is displayed. The system control unit 50 loads a program stored in the non-volatile memory 56 onto the system memory 52 and executes the program to realize the processing.

The processing in steps S801 to S805 is similar to the processing in steps S301 to S305 in FIG. 3.

In step S806, the system control unit 50 starts measuring a touch time (time period) T. The touch time T indicates how long the touch is performed continuously after a start of the touch is detected in step S805. The touch time T is measured by a system timer in the system control unit 50.

The processing in steps S807 to S810 is similar to the processing in steps S306 to S309 in FIG. 3.

In step S811, the system control unit 50 determines whether the touch time T, the measurement of which is started in step S806, is a predetermined time or more (e.g., 1 second, 1.5 seconds, or 2 seconds). If the system control unit 50 determines that the touch time T is a predetermined time or more (YES in step S811), the processing proceeds to step S812. If the system control unit 50 determines that the touch time T is less than the predetermined time (NO in step S811), the processing proceeds to step S813.

In step S812, similar to the processing in step S310 in FIG. 3, the system control unit 50 displays the vertical and the horizontal lines passing through the Touch-Down frame (region), which indicate a position of the selected one point. Since the vertical and the horizontal lines are displayed in step S812 when the touch time T is determined to be a predetermined time or more in step S811, the user can figure out the position of the touched frame more accurately. In the present exemplary embodiment, the vertical and the horizontal lines are displayed when the touch time T is determined to be the predetermined time or more in step S811 (i.e., determined as "YES"), and the vertical and the horizontal lines are not displayed when the determination result is "NO". Therefore, if the user has already determined a frame to touch, and pointedly touches the frame and quickly releases the touch in less than a predetermined period, the vertical and the horizontal lines are not displayed. When the user determines the frame to select and quickly performs the touch operation, a cursor is promptly displayed on the touched frame in step S816 described below (through the processing similar to that of step S313 in FIG. 3). Therefore, the user is likely to figure out which frame of what position is touched accurately. Further, even in a case where the user does not accurately figure out the frame, the cursor is displayed promptly. Furthermore, when the user quickly touches the frame, it is possible to prevent the lines from flickering when the lines are displayed instantaneously. When Touch-Move is detected (i.e., determined as "YES") in step S814 described below, the vertical and the horizontal lines are also displayed in step S812. In addition, if the vertical and the horizontal lines are already displayed, the vertical and the horizontal lines will not be newly displayed in step S812.

In step S813, similar to the processing in step S311 in FIG. 3, the system control unit 50 sets (specifies) the touched frame (region of the touched frame) as the AF focusing point (region), and stores the setting in the system memory 52.

In step S814, the system control unit 50 determines whether the touched position is moved. The system control unit 50 determines whether the touched position is moved from the touched position detected in step S805 or the touched position detected in step S312 of one processing cycle before. If the system control unit 50 determines that the touched position is moved (YES in step S814), the processing proceeds to step S812. On the other hand, if the system control unit 50 determines that the touched position is not moved (NO in step S814), the processing proceeds to step S815. When the touch time T is determined as a predetermined time or more in step S811, the vertical and the horizontal lines are displayed in step S812. However, in a case where the system control unit 50 determines that the touched position is moved in step S814, the vertical and the horizontal lines are displayed even if the touch time T is less than the predetermined time. In other words, the vertical and the horizontal lines passing through the touched point are displayed when the user touches the same position for a predetermined time or more after starting the touch, or when the touched position is moved in less than a predetermined time after the touch is started. When the user moves the touched position, even if the touch time T is less than a predetermined time, the frame at the position of the current touch may be different from the frame at the touch-start position. In this case, there is a possibility that the user does not accurately figure out the position of the touched frame. Therefore, if the touched position is moved in step S814, the processing proceeds to step S812, and the lines are displayed thereon.

The processing in steps S815 to S821 is similar to the processing in steps S312 to S318 in FIG. 3.

According to the present exemplary embodiment, when the frame provided on the selection screen is selected through the touch operation of the touch panel configured integrally with the display unit, the frame selected by the user can be accurately indicated to the user without lowering the visibility. Further, since the vertical and the horizontal lines are not displayed when the user quickly performs a touch, the flickering can be prevented.

Further, various types of controls described as the operation executed by the system control unit 50 may be executed by a single piece of hardware, or a plurality of pieces of hardware may execute the control of the entire apparatus by sharing the processing.

While the present invention has been described in detail with reference to the exemplary embodiments, it is to be understood that the present invention is not limited to the above-described specific exemplary embodiments, and various variations within the spirit and the scope of the invention should be included in the present invention. Further, the above-described exemplary embodiments merely illustrate one exemplary embodiment embodying the present invention, and each of the exemplary embodiments can be combined as appropriate.

Further, in the above-described exemplary embodiments, examples in which the present invention is applied to the digital camera 100 have been described, the exemplary embodiment is not limited thereto, and the present invention is applicable to an electric device capable of selecting a target through a touch operation on a display unit. More specifically, the present invention is applicable to a personal computer (PC), a mobile phone terminal, a mobile type image viewer, a digital photo frame, a music player, a game machine, an electronic book reader, a tablet PC, a smartphone, and a home electric appliance having a display unit.

Other Exemplary Embodiments

The present invention can be realized by executing the following processing. Specifically, software (programs) for realizing the function of the above-described exemplary embodiments is supplied to a system or an apparatus via a network or various storage media, so that a computer (or a CPU or a micro processing unit (MPU)) of the system or the apparatus reads and executes the program code. In this case, the program and the storage medium storing that program constitute the present invention.

According to the present invention, a position selected by the user can be indicated more clearly and accurately when the position is selected through a touch operation onto a touch panel configured integrally with the display unit.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-110352, filed Jun. 1, 2016, and No. 2016-174893, filed Sep. 7, 2016, which are hereby incorporated by reference herein in their entirety.

What is claimed is:

1. A display control apparatus comprising:
at least memory and at least one processor that cause the display control apparatus to:
detect a touch performed on a display unit;
specify a specifying object in a predetermined region of the display unit according to a touched position;
control, in response to a touch being performed in the predetermined region, to display an object identification mark in the predetermined region to indicate a first axis and a second axis, wherein an intersection point of the first axis and the second axis corresponds with the specified specifying object based on the touched position of the touch, and to hide the object identification mark when the touch is released;

switch between a first mode in which the display control apparatus specifies a target from targets of a first type in the predetermined region and a second mode in which the display control apparatus specifies a target from targets of a second type different from the targets of the first type in the predetermined region;

control the object identification mark not to be displayed in a case where a touch is released from a position where the touch is started before a predetermined time has passed after the touch onto the predetermined region is started; and control the object identification mark to be displayed according to a touch performed in the predetermined region in the first mode, and control the object identification mark not to be displayed even if a touch is performed in the predetermined region in the second mode.

2. The display control apparatus according to claim 1, wherein, when the touch is released after the object identification mark is displayed, the display control apparatus controls a mark that indicates a target specified according to a touched position to be displayed.

3. The display control apparatus according to claim 1, wherein the object identification mark is a display which indicates at least a target adjacent to a specified target according to the touched position.

4. The display control apparatus according to claim 1, wherein the object identification mark is a display of a line indicating the first axis and a line indicating the second axis, which pass through a target specified according to the touched position.

5. The display control apparatus according to claim 1, wherein, from among the predetermined region, the object identification mark is displayed in a region which does not include a target specified according to the touched position.

6. The display control apparatus according to claim 1, wherein the object identification mark includes a line that connects one end to another end in the predetermined region in a direction of the first axis of the predetermined region and a line that connects one end to another end in a direction of the second axis of the predetermined region.

7. The display control apparatus according to claim 1, wherein the first axis and the second axis are orthogonal to each other.

8. The display control apparatus according to claim 1, wherein a size of the target of the first type in the predetermined region is smaller than a size of the target of the second type in the predetermined region.

9. The display control apparatus according to claim 1, wherein a number of targets of the first type in the predetermined region is greater than a number of targets of the second type in the predetermined region.

10. The display control apparatus according to claim 1, wherein a plurality of targets that can be specified by the display control apparatus according to the touched position is arranged and displayed in the first axis direction and the second axis direction in the predetermined region.

11. The display control apparatus according to claim 1, wherein a plurality of targets that can be specified by the display control apparatus is arranged and displayed in a plurality of rows and columns in the predetermined region, and wherein the object identification mark makes targets displayed in a same row and a same column of a target specified by the display control apparatus according to a touched position be displayed in a display appearance different from a display appearance of targets displayed in different rows and columns.

12. The display control apparatus according to claim 1, wherein a specification pattern can be switched between a position specification pattern for specifying a target according to a touched position in the predetermined region and a region specification pattern for specifying a region including a target according to a touched position and any of targets adjacent to the target in the predetermined region, and wherein, according to a touch performed in the predetermined region, the display control apparatus controls the object identification mark to be displayed in a thickness of an axis according to the target in a case where the specification pattern is switched to the position specification pattern, and controls the object identification mark to be displayed in a thickness of an axis according to the region which is thicker than the thickness according to the target in a case where the specification pattern is switched to the region specification pattern.

13. The display control apparatus according to claim 1, wherein the at least memory and at least one processor further cause the display control apparatus to accept a specification operation for specifying a target in the predetermined region onto an operating member, wherein, according to an acceptance of the specification operation onto the operating member, the display control apparatus controls a mark that indicates a target specified according to the specification operation to be displayed without displaying the object identification mark.

14. The display control apparatus according to claim 1, wherein the predetermined region is a region for performing a predetermined setting, and wherein, according to a touch performed in the predetermined region, a setting value of the predetermined setting is set to a setting value corresponding to a touched position.

15. The display control apparatus according to claim 1, wherein the predetermined region is a region for specifying an autofocus frame, and a plurality of frames that can be specified as an autofocus position is displayed in the predetermined region.

16. The display control apparatus according to claim 15, wherein, when the autofocus frame is to be specified, a selection method can be switched between a plurality of selection patterns including a zone selection and a one-point selection, and wherein, in a case where the selection pattern is switched to the zone selection, the display control apparatus controls the object identification mark not to be displayed even if a touch is performed in the predetermined region.

17. The display control apparatus according to claim 1, wherein the predetermined region is a region for displaying a live view image, and the display control apparatus specifies a position for executing autofocus processing based on a touched position in the live view image.

18. The display control apparatus according to claim 1, wherein the predetermined region is a region for displaying a setting screen for setting a white balance, and a value of the white balance is set according to the touched position in the setting screen of the white balance.

19. The display control apparatus according to claim 18, wherein, in the setting screen of the white balance, the first axis direction indicates a color temperature and the second axis direction indicates a color correction different from the color temperature, and
wherein the display control apparatus controls a line indicating the first axis direction and a line indicating the second axis direction to be displayed in respective colors corresponding to set values according to the touched position as the object identification mark.

20. The display control apparatus according to claim 1, wherein the display control apparatus controls the object identification mark to be displayed according to passage of the predetermined time after the touch onto the predetermined region is started.

21. The display control apparatus according to claim 1, wherein the display control apparatus controls the object identification mark to be displayed according to movement of a touched position even if the predetermined time has not passed after the touch with onto the predetermined region is started.

22. A control method for a display control apparatus including a display unit, the method comprising:
detecting a touch performed on the display unit;
specifying a specifying object in a predetermined region of the display unit according to a touched position;
controlling, in response to a touch being performed in the predetermined region, to display an object identification mark in the predetermined region to indicate a first axis and a second axis, wherein an intersection point of the first axis and the second axis corresponds with the specified specifying object based on the touched position of the touch, and to hide the object identification mark when the touch is released; and
switching between a first mode in which the display control apparatus specifies a target from targets of a first type in the predetermined region and a second mode in which the display control apparatus specifies a target from targets of a second type different from the targets of the first type in the predetermined region;
controlling the object identification mark not to be displayed in a case where a touch is released from a position where the touch is started before a predetermined time has passed after the touch onto the predetermined region is started; and
controlling the object identification mark to be displayed according to a touch performed in the predetermined region in the first mode, and controlling the object identification mark not to be displayed even if a touch is performed in the predetermined region in the second mode.

23. A non-transitory computer-readable storage medium storing a program for executing a control method for a display control apparatus including a display unit, the method comprising:
detecting a touch performed on the display unit;
specifying a specifying object in a predetermined region of the display unit according to a touched position;
controlling, in response to a touch being performed in the predetermined region, to display an object identification mark in the predetermined region to indicate a first axis and a second axis, wherein an intersection point of the first axis and the second axis corresponds with the specified specifying object based on the touched position of the touch, and to hide the object identification mark when the touch is released;
switching between a first mode in which the display control apparatus specifies a target from targets of a first type in the predetermined region and a second mode in which the display control apparatus specifies a target from targets of a second type different from the targets of the first type in the predetermined region;
controlling the object identification mark not to be displayed in a case where a touch is released from a position where the touch is started before a predetermined time has passed after the touch onto the predetermined region is started; and
controlling the object identification mark to be displayed according to a touch performed in the predetermined region in the first mode, and controlling the object identification mark not to be displayed even if a touch is performed in the predetermined region in the second mode.

* * * * *